United States Patent [19]

Troy et al.

[11] Patent Number: 4,630,844
[45] Date of Patent: Dec. 23, 1986

[54] TWO-STEP BANK DRAFT

[76] Inventors: Seymour L. Troy; Kenneth E. Mullenix, both of P.O. Box 5027, Ft. Lauderdale, Fla. 33310

[21] Appl. No.: 758,511

[22] Filed: Jul. 24, 1985

[51] Int. Cl.⁴ .................. B42D 15/00; A63F 1/18; G06F 15/20
[52] U.S. Cl. .................. 283/67; 283/100; 273/139; 364/408
[58] Field of Search .............. 283/56, 67, 98–102, 283/901; 273/138 R, 139; 364/408; 340/825.33, 825.34; 235/379

[56] References Cited

U.S. PATENT DOCUMENTS 512,985   1/1894  Mims ........................ 283/67
2,999,698 9/1961  Hoese ....................... 283/100
4,095,824 6/1978  Bachman .................... 273/139
4,321,672 3/1982  Braun et al. ............... 364/408

Primary Examiner—Paul A. Bell
Assistant Examiner—Paul M. Heyrana
Attorney, Agent, or Firm—Kane, Dalsimer, Kane, Sullivan and Kurucz

[57] ABSTRACT

A sales promotional system includes a first sheet having an incomplete check having certain information missing therefrom. A participant obtains the missing information (e.g. by purchasing a designated product or service) and, if the information matches the check, adds it by hand to the first sheet to create a bankable entity. Validation procedures are employed to assure that submitted check combinations are genuine.

6 Claims, 1 Drawing Figure

FIG. 1

TWO-STEP BANK DRAFT

FIELD OF THE INVENTION

This invention pertains to an apparatus and method for piecing together a bankable instrument for sales promotion, and more particularly to a promotional check or draft to be combined with additional information by a consumer for direct cashing or depositing at a bank.

BACKGROUND OF THE INVENTION

Numerous sales promotion systems are in use in the marketplace today. One common promotional activity is a sweepstakes offer in which consumers are invited to mail in entries, the winners to be chosen in a lottery style selection. However, this system encourages many non-buyers of the item being promoted to take advantage of the sweepstakes but not to purchase the item being promoted.

Another promotional system includes product producers mailing samples to home occupants when introducing new products. Commonly an insert is provided with a cents-off coupon enclosed to encourage a store sale.

Conventional promotional systems have the disadvantage of being single step in nature with the consequential disadvantage that either nominal sums are offered, as in the case of a cents-off coupon, or, as in a sweepstakes, the consumer is merely one of a large pool of participants having no advantage over the others. In addition, the selection process is a far future event.

As can be seen from the above, current sales promotional methods are limited in application and level of encouragement to a consumer.

SUMMARY OF THE INVENTION

In this description the term "check" includes a bank draft. The term "bankable" means acceptable to a bank.

According to the present invention a check which is missing necessary information for completion is initially provided to the consumer, and a missing identification number and dollar sign amount is later provided and written in by the participant to complete the bankable entity. The identification number provides a verification means.

The present invention provides a sales promotion means whereby a consumer is given one or more standard size bankable checks via standard methods of distribution, e.g., direct mail, magazine and newspaper inserts, inpack, on-pack, from store, or other give-away. The checks are so designed as to conform to the Uniform Commercial Code (UCC) guidelines under Article III relating to a form of a bank check, but may be in effect a bank draft. The check on its face appears to be a standard bank check. The reason for a draft being used is that a check is a negotiable instrument and is handled by a bank with standard clearing procedures while a draft is handled by clearing procedures subject to conditions as stated on the draft. It is contemplated that the draft of the present invention is to be physically isolated at the designated clearing bank and is made available to a verification and/or validation process prior to re-routing into the clearing process for payment.

The primary advantage of the present invention is that the checks are issued to carry high script dollar amount values. Thus incentive is provided to a holder of an incomplete check to seek out the dollar match.

Another advantage is that the dollar value match directly creates an immediate gratification to the participant and a bankable entity increases incentive to the consumer and an overall efficiency of the system.

Another advantage is that the promotion is a two step process, the first step (receipt of an incomplete check) putting a holder at a distinct advantage as compared to other style program participants while the award offered to the holder is immediate and substantial. It is contemplated that a holder of a large dollar amount incomplete check will actively seek out a matching dollar amount.

Many advantageous uses are contemplated. Rather than the cents-off coupon mailed with a sample commonly used in the past, an incomplete check may be inserted with the sample along with a reference that each store package of the brand involved carries the missing identification number and dollar sign amount.

Another example of an advantageous use includes a situation where an electric company issues a bill due by a specific date. Untimely payment loses interest for the creditor. To encourage timely payments the creditor mails with its bill one of the incomplete checks of the invention. The debtor is advised that if timely payment is received, the next bill rendered will include the necessary identification number and dollar sign amount for a match possibility. Each month a new incomplete check is mailed for an ongoing program.

Other advantageous examples exist including encouraging airline passengers not to switch planes by providing a check when obtaining the ticket, and providing the missing information to the passenger when he is seated in the plane.

Store or agency traffic may also be increased by distributing incomplete checks by the many and varied conventional channels used. To complete the check a participant must visit the establishment and obtain the missing identification number and dollar amount.

To achieve the above objects and advantages the present invention provides a sales promotional check for direct deposit, (or cashing) at a bank as a bank draft comprising:

a preprinted sheet having at least a portion which conforms to a bankable bank draft;

identifying information affixed to the first sheet to complete the bankable bank draft; and verifying means for verifying that the identifying information affixed to the first sheet was obtained from a proper source.

BRIEF DESCRIPTION OF THE DRAWING

FIG. 1 is an elevated view of an alternate embodiment of a check face according to the present invention.

DETAILED DESCRIPTION OF THE PREFERRED EMBODIMENT

Figure 1:
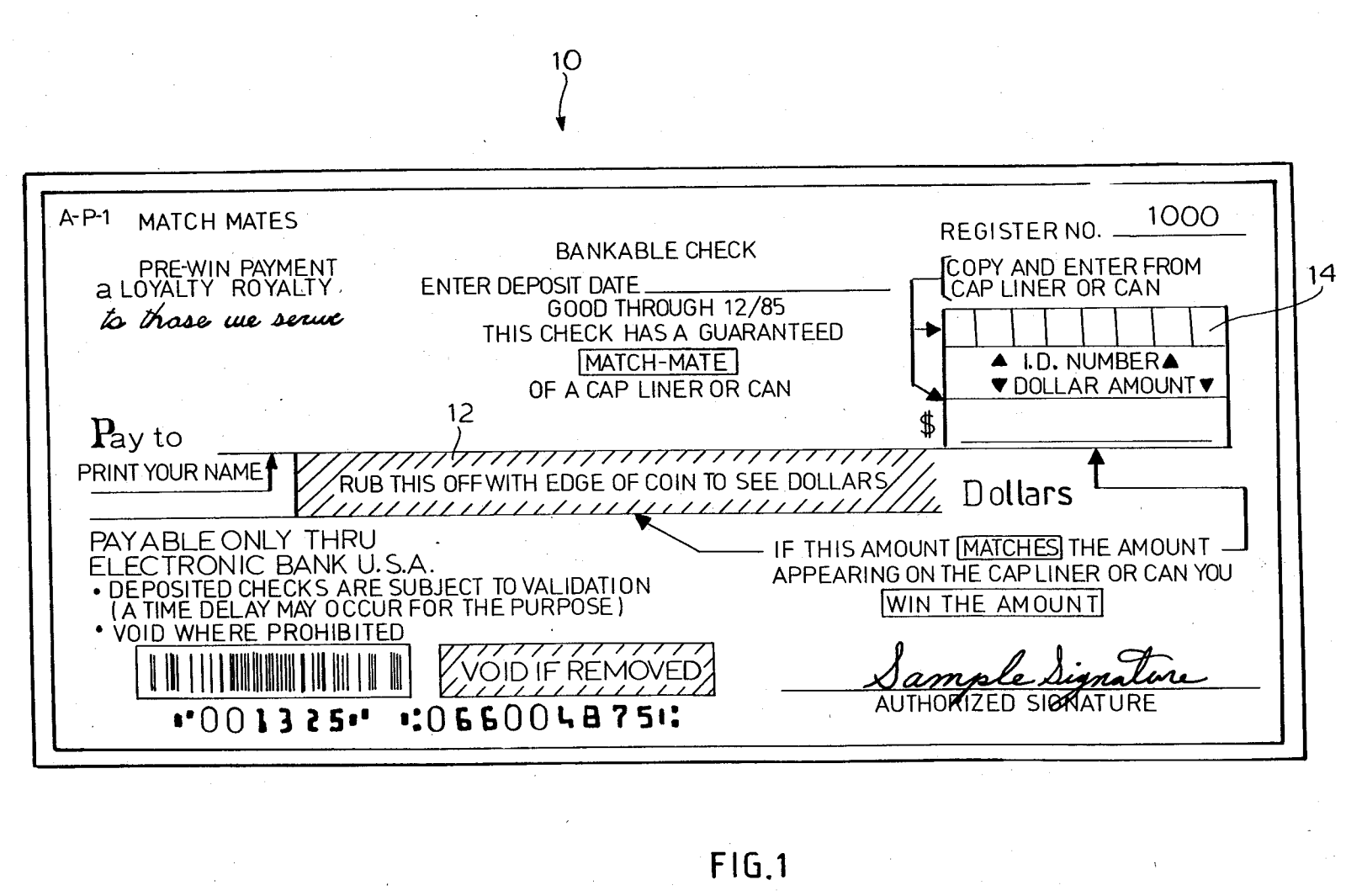

FIG. 1 discloses the present invention wherein a check 10, is provided. It is contemplated that a consumer will be provided with check 10 and will rub off overlay 12 to see the preprinted script dollar amount. The consumer will then purchase the item being promoted, e.g. a soft drink in a can or bottle. On the retail item the identification number, for placement into spaces 14, and the dollar amount are provided. This information may be placed on a bottle cap liner, a can, underside of a label, in-pack, on-pack, or as part of a pack. The identification number and dollar amount are entered by hand by the participant or by adhering an in-pack supplied printed I.D. # and numerical dollar amount to sheet 10. The identification number and numerical dollar amount are inseparable and are subject to the validation process. Assuming a valid entry is made of the identification number and numerical dollar amount, and that the numerical dollar amount is equal to the preprinted script amount, the check is then of bankable status and subject to a validation process at the clearing bank for payment.

Overlay 12, covering the script dollar amount, is intended to avoid selective pilferage at all levels of distribution and in some measure to add a suspense for participant's entertainment. Overlay 12 also insures the participant that no devisive tactic was employed that might be of schemed control.

A description of the production and validation processes follows. Upon selection of the desired potential win patterns, lists for printing of product imprint (i.e., bottle cap liners and can lids) as well as bank checks are computer generated. The control of the win liability is vested in the assignment of dollar amounts on the checks versus that of those on the cap liners/can lids (product containers). Lists on machine readable media only are to be supplied to the cap and lid manufacturer (bottle or processor). The machine readable lists will be applied to the cap/lid by the manufacturer. When printed, each cap or lid will show a serial I.D. number and a dollar amount. If technologically possible it is recommended that the cap liners and can lids be covered (on the printed side) with an opaque removable material, such as dark latex. This is a recommended security precaution to avoid operating employee pilferage. The check printer will print the check numbers and script dollar amounts from the list provided. Another number will be generated by a complex formula, using the check number and script amount. This number will be printed under the "do not remove" covering and appears as a bar code, magnetic code, or other machine readable code in another area of the check. The lists (maintained by computer) will be encoded to save memory space and stored on hard disk or comparable mass storage memory at the validation computer.

Arrangements will be made to place equipment and an operator at the clearing bank premises, for validation of the checks prior to the clearing process.

This equipment shall be capable of:

(1) Reading (scanning) the numbers on the bottom of the check and the bar code, and/or other machine readable code.

(2) Receiving data from a keyboard.

(3) Communicating with the computer.

(4) Displaying and printing small amounts of data.

The computer will verify that both the check number and I.D. number are valid for the check amount by referring to encoded files.

If check number and I.D. number are valid, both records will be updated to reflect that validation has occurred, at which time a valid signal will be transmitted to the terminal (bank location computer).

If either check number or I.D. number do not agree with the amount, or if either number has been flagged as previously validated, an invalid signal will be sent.

Upon receipt of a valid signal, the terminal will display and print the check number, amount, and "valid". The operator will place the check in the valid stack and proceed with the next check.

Upon receipt of an invalid code, "invalid" will be displayed and printed on continuous paper roll. The operator will isolate the check for re-examination.

Any valid checks which appear improper in appearance to the operator will be set aside for verification of the number under the "Do Not Remove" area, and other examination for possible improprieties.

Any valid checks over $100.00 (or other amount to be established) will be re-examined and either passed for clearance or held subject to receipt of the related cap/lid (container) from the depositor. All checks will be returned to the bank for concluding the banking process.

The disclosed embodiments effectively attain the objects and advantages of the present invention. Although preferred embodiments of the present invention are discussed, it should be understood that the present invention is not to be limited thereby, but is to be determined by the claims which follow.

We claim:

1. A sales promotional check for direct deposit or cashing at a bank as a bankable item comprising:
   a preprinted sheet having at least a portion which conforms to a bankable bank draft and having a first dollar amount and means for receiving a second dollar amount and an identification number;
   identifying information obtained from an outside commercial source affixed to the preprinted sheet to complete the bankable bank draft, the identifying information comprising the second dollar amount which matches the first dollar amount, and the identification number; and
   verifying means for verifying that the identifying information affixed to the preprinted sheet was obtained from a proper source.

2. A sales promotional check for direct deposit or cashing at a bank as a bankable item comprising:
   a preprinted sheet having at least a portion which conforms to a bankable bank draft wherein the sheet further comprises a payee line, a register number, a script dollar amount, a machine readable code, a code number and a signature;
   identifying information affixed to the sheet to complete the bankable bank draft wherein the identifying information comprises an identification number and a numerical dollar amount, the sheet having preprinted blank spaces therefor; and
   verifying means for verifying that the identifying information affixed to the sheet was obtained from a proper source.

3. A method of providing a bank draft comprising the steps of:
   providing a preprinted sheet to a participant, the preprinted sheet having a first dollar amount printed thereon;
   instructing the participant in how to obtain a matching dollar amount by providing instructional literature on the preprinted sheet;
   providing matching dollar amounts accessible to participants by placing a dollar amount and an identification number in or on a commercial item to be purchased by the participant;
   validating bank drafts submitted by participants having matching dollar amounts; and
   paying the bank drafts having matching dollar amounts.

4. A method of forming and redeeming a bankable bank draft comprising the steps of:

obtaining a first portion of a bankable bank draft comprising a sheet having a first dollar amount and a means for receiving a second dollar amount and an identifying symbol;

obtaining a corresponding source of information from an outside commercial source containing a second dollar amount, matching the first dollar amount, and the identification symbol;

affixing the second dollar amount and the identification symbol to the means for receiving same to complete the bankable bank draft; and depositing or cashing the bank draft.

5. A method of providing a redeemable bank draft comprising the steps of:

providing a preprinted portion of a bank draft to a participant having a first dollar amount printed thereon and having spaces for a second dollar amount and an identification number;

placing the second dollar amount, which matches the first dollar amount, and the identification number for verifying the second dollar amount, on an outside commercial source;

providing the outside commercial source to the participant and instructing the participant to combine the data from the outside commercial source with the preprinted portion of a bank draft to form a bankable bank draft; and validating and paying the bankable bank draft.

6. A method of providing a redeemable bank draft comprising the steps of:

providing a preprinted portion of a bank draft to a participant having a first dollar amount printed thereon and having spaces for a second dollar amount and an identification number;

placing the second dollar amount which matches the first dollar amount, and the identification number for verifying the second dollar amount, on an outside commercial source;

combining the second dollar amount and the identification number from the outside source with the preprinted portion of a bank draft to form a bankable bank draft; and validating and paying the bankable bank draft.

* * * * *